UNITED STATES PATENT OFFICE.

LUDWIG TAUB AND HANS JOACHIM HAHL, OF ELBERFELD, GERMANY, ASSIGNORS TO SYNTHETIC PATENTS CO., INC., OF NEW YORK, N. Y., A CORPORATION OF NEW YORK.

ACIDYL DERIVATIVES OF C-ORTHO-ALLYL-ORTHO-BENZOIC ACIDS.

1,113,713.     Specification of Letters Patent.     Patented Oct. 13, 1914.

No Drawing.     Application filed December 20, 1913. Serial No. 808,024.

*To all whom it may concern:*

Be it known that we, LUDWIG TAUB and HANS JOACHIM HAHL, doctors of philosophy, chemists, citizens of the German Empire, residing at Elberfeld, Germany, have invented new and useful Improvements in Acidyl Derivatives of C-Ortho-Allyl-Ortho-Benzoic Acids, of which the following is a specification.

We have found that the hitherto unknown acidyl derivatives of C-ortho-allyl-ortho-oxybenzoic acids being valuable antipyretics e. g. the acetyl-ortho-allyl salicylic acid having most probably the formula:

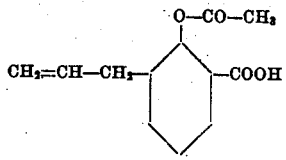

can be obtained by treating the C-allyl-ortho-oxybenzoic acids e. g. the ortho-allyl-salicylic acid, the ortho-allyl-cresotinic acids, etc., with an acidylizing agent, such as acetyl chlorid, propionyl chlorid, etc.

The new compounds have most probably the following graphically represented constitution or formula,

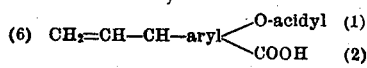

in which the aryl nucleus may or may not be further substituted and are after being dried and pulverized whitish crystalline substances soluble in organic solvents, scarcely soluble in water, giving in contradistinction to the free acid no coloration with ferric chlorid, and being saponified by treatment with caustic soda lye.

In order to illustrate the new process more fully the following example is given, the parts being by weight:—In a vessel provided with a reflux condenser 178 parts of C-allyl-salicylic acid:

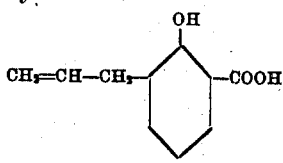

obtainable, as described in the patent of Claisen, No. 1,094,123, April 21, 1914, by heating the O-allyl-salicylic acid ester and saponifying the resulting C-allyl-salicylic acid ester are heated during four hours together with 82 parts of anhydrous powdered sodium acetate ($CH_3$—COONa) and 204 parts of acetic acid anhydrid (($CH_3$—CO)$_2$O). Subsequently the mixture is heated to boiling together with 400 parts of water to saponify the excess of the anhydrid, the acetyl compound thus produced is washed with hot water and is then crystallized from benzene. It has most probably the formula represented graphically as follows:

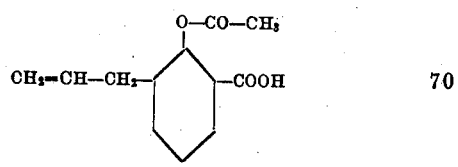

It crystallizes from benzene in the shape of needles melting at 94 to 96° C. It is soluble in the usual organic solvents and difficultly soluble in water and forms salts with alkali, alkali earths or heavy metals. The calcium salt is a crystalline powder easily soluble in water.

The new compound has proved to be a valuable antipyretic, antineuralgic and antirheumatic.

C-allyl-cresotinic acid:

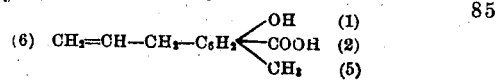

or other derivatives of salicylic acid can be used as parent materials. The allyl-acetyl-meta-cresotinic acid

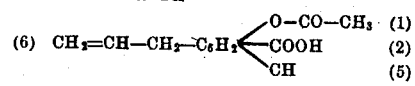

crystallizes from benzene in the shape of colorless prisms melting at 138–140° C.

We claim:

1. As new products acidyl derivatives of C-ortho-allyl-ortho-oxybenzoic acids having most probably the following graphically represented formula:

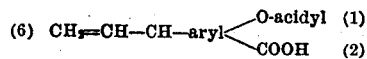

being valuable antipyretics which are after being dried and pulverized whitish crystalline substances soluble in organic solvents, scarcely soluble in water and forming salts with alkali, alkali earths or heavy metals, substantially as described.

2. As a new product the acetyl-ortho-allyl-salicylic acid having most probably the formula:

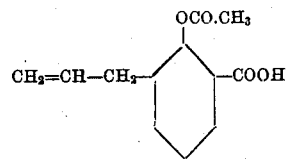

having proved to be a valuable antipyretic, antineuralgic and antirheumatic, which crystallizes from benzene in the shape of colorless needles melting at 94 to 96° C. soluble in benzene, toluene and similar organic solvents and difficultly soluble in water and forms salts with alkalies, alkali earths and heavy metals the calcium salt being a crystalline powder substantially as described.

In testimony whereof we have hereunto set our hands in the presence of two subscribing witnesses.

LUDWIG TAUB. [L. S.]
HANS JOACHIM HAHL. [L. S.]

Witnesses:
ALBERT NUFER,
FRANCES NUFER.